(12) United States Patent  
Moreno et al.

(10) Patent No.: US 7,124,777 B2  
(45) Date of Patent: Oct. 24, 2006

(54) REVERSING VALVE WITH FLOWSPLITTER

(75) Inventors: Jack A. Moreno, Delaware, OH (US); Lawrence B. Hall, Plain City, OH (US); Scott R. Schneller, Hilliard, OH (US); Richard E. Ballard, London, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 111 days.

(21) Appl. No.: 10/934,522

(22) Filed: Sep. 3, 2004

(65) Prior Publication Data

US 2006/0048828 A1  Mar. 9, 2006

(51) Int. Cl.  
*F16K 11/065* (2006.01)

(52) U.S. Cl. .................. 137/625.43; 137/309; 251/118

(58) Field of Classification Search ................ 137/309, 137/625.43; 251/118  
See application file for complete search history.

(56) References Cited

U.S. PATENT DOCUMENTS

| | | | | |
|---|---|---|---|---|
| 754,272 | A | * | 3/1904 | Atha ........................... 137/249 |
| 1,488,988 | A | * | 4/1924 | Isley ........................ 236/93 R |
| 4,290,453 | A | * | 9/1981 | Bauer .................... 137/625.43 |
| 4,966,194 | A | * | 10/1990 | Nakatsukasa et al. .. 137/625.43 |

* cited by examiner

*Primary Examiner*—John Fox  
(74) *Attorney, Agent, or Firm*—Reinhart Boerner Van Deuren P.C.

(57) ABSTRACT

Provided is a reversing valve for reversing flow in a refrigeration system. The reversing valve includes a valve body having first, second, third, and fourth ports disposed into the valve body. A valve member inside the valve body can be selectively moved between a first position intersecting the second and third ports and a second position intersecting the second and fourth ports. The valve member defines a channel that directs flow between the selected pairs of ports. The channel is generally shaped as a curve that bends the flow between the selected ports. To reduce the pressure drop across the reversing valve, a flow splitter is included that divides the channel into multiple sub-channels. Dividing the channel into multiple sub-channels increases the curve ratio of the channel, which reduces the generation of turbulent secondary flows in the channel. The flow splitter also provides additional structural support to the valve member.

27 Claims, 8 Drawing Sheets

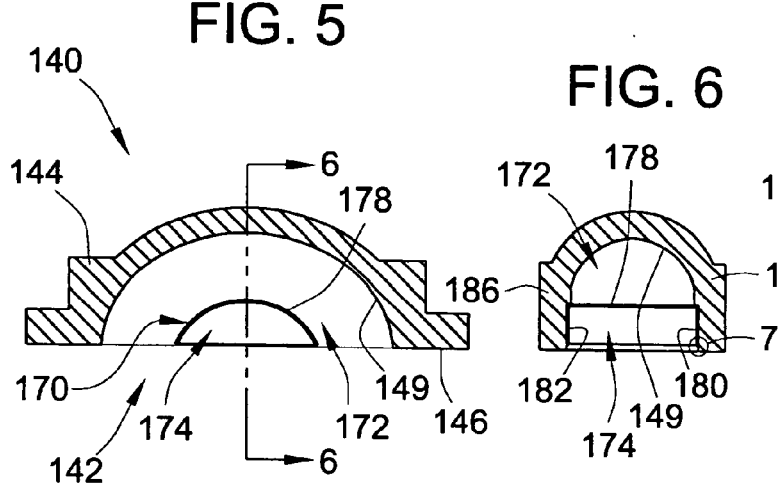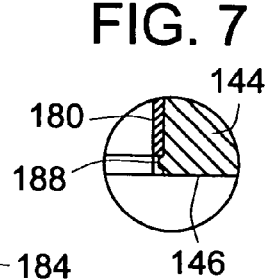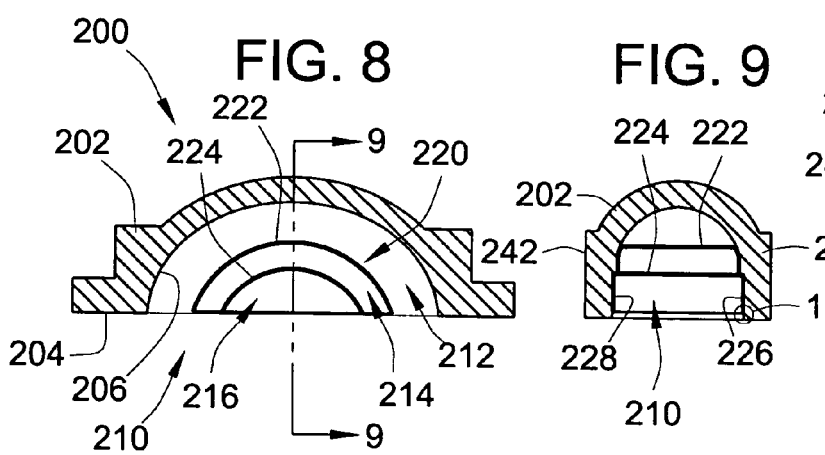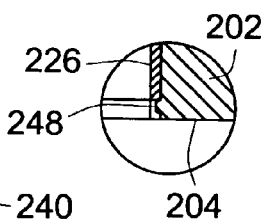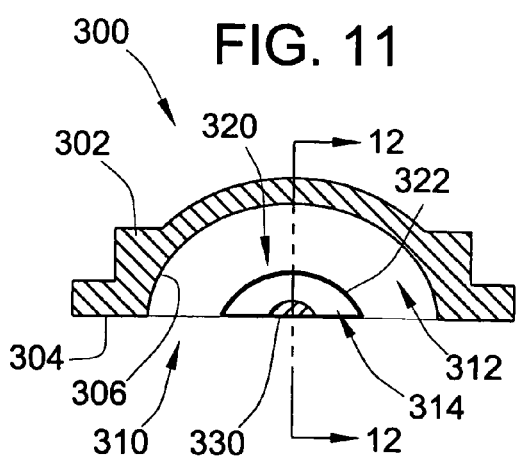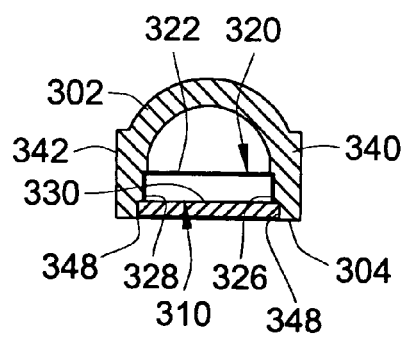

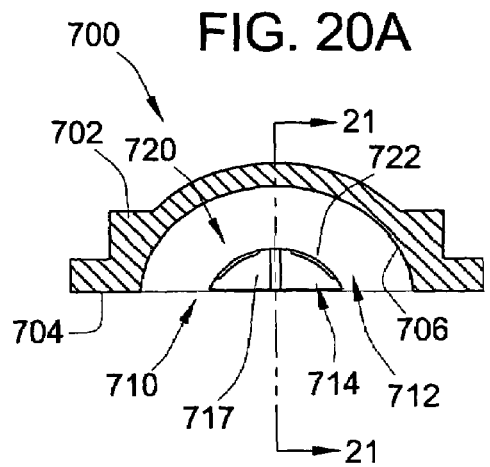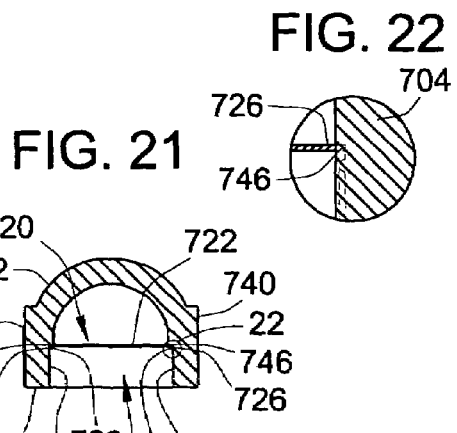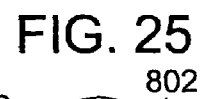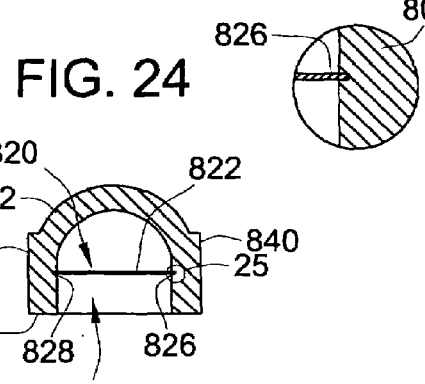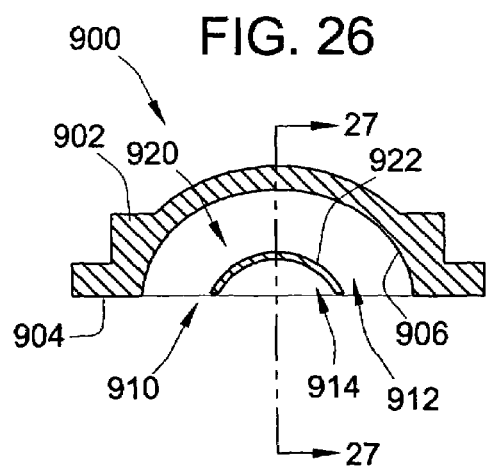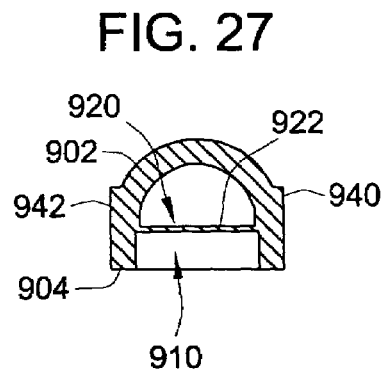

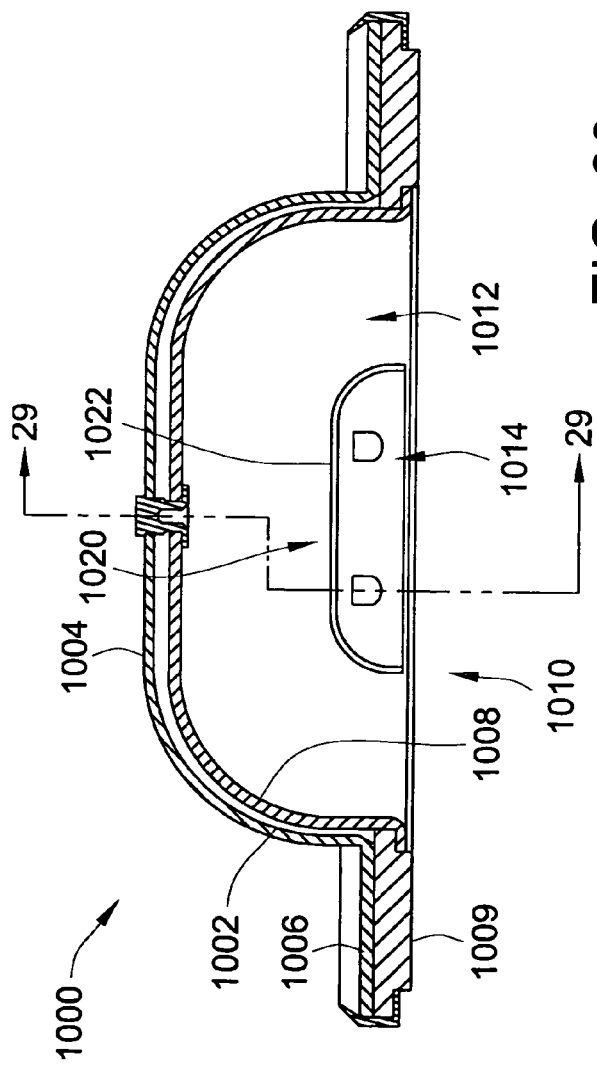
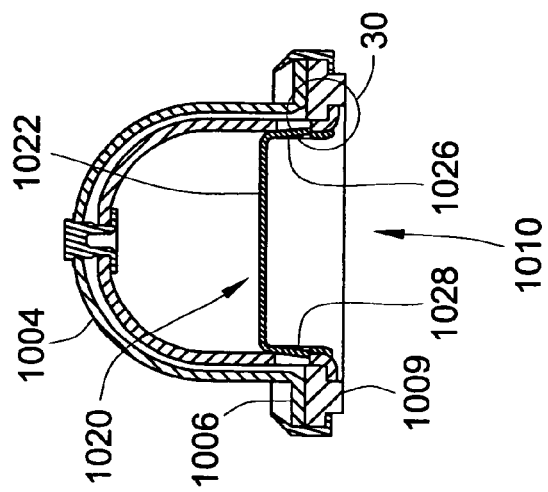
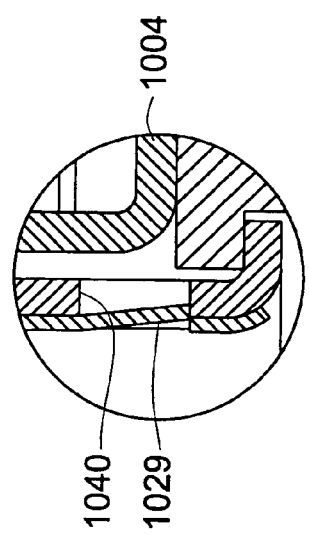

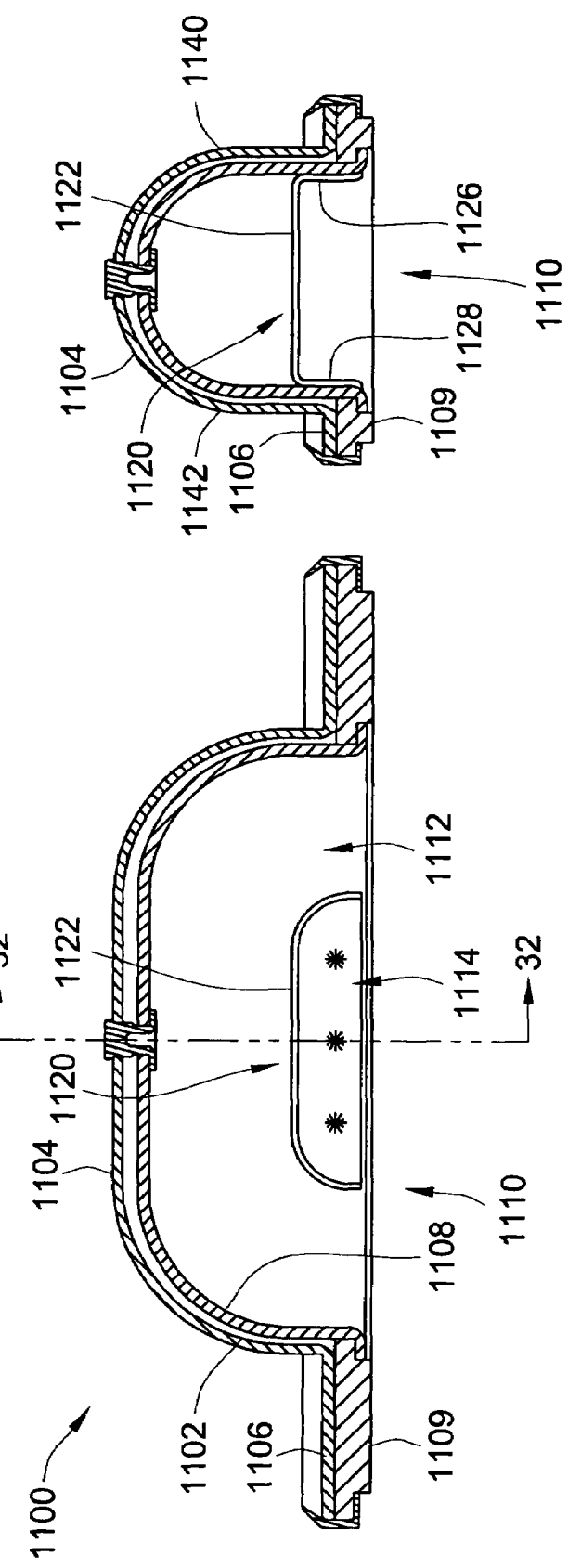

REVERSING VALVE WITH FLOWSPLITTER

FIELD OF THE INVENTION

This invention pertains generally to flow control valves and particularly to flow reversing valves for use in refrigeration systems.

BACKGROUND OF THE INVENTION

Reversing valves are typically used in various systems in which a fluid is directed to flow in various alternative loops or circuits. For instance, heat pumps are specialized refrigeration systems that can be selectively configured to operate in either of two different modes. In the first mode, known as the cooling mode, energy in the form of heat is removed from an "inside" environment and transferred to an "outside" environment. Accordingly, in the second mode, known as the heating mode, heat energy is transferred into the inside environment. To convey the heat energy, the heat pump system uses a compressor to circulate fluid refrigerant through a closed system that includes heat transfer coils located in each environment. In addition to circulating the refrigerant, the compressor is used to impart heat energy into the system.

To switch the heat pump system between heating and cooling modes, the system uses a reversing valve that can be selectively manipulated to alter the flow of refrigerant. Specifically, a 4-way reversing valve can be installed which reverses the direction of refrigerant flow through the heat transfer coils. Such a reversing valve typically includes four or more separate ports through which the reversing valve is connected to the rest of the heat pump system. The first port is always in communication with the high pressure discharge of the compressor while the second port is always in communication with the low pressure inlet of the compressor. The remaining two ports, or system ports, are in communication with the heat transfer coils.

The reversing valve also includes a movable valve member that can be selectively placed into one of two alternative positions. In the first position, the valve member channels refrigerant directly between the second port communicating with the compressor inlet ("the compressor inlet port") and one of the system ports while in the second position the valve member channels refrigerant directly between the compressor inlet port and the other system port. In addition to channeling the refrigerant directly between the compressor inlet port and either of the system ports, the valve member functions to prevent the high pressure refrigerant from the first port communicating with the compressor discharge ("the compressor discharge port") from directly entering the compressor inlet port. Because the valve member is subject to the large pressure differential existing between the compressor discharge port and the compressor inlet port, prior art valve members are often provided with additional support structures. These support structures are typically located proximate to where the valve member encounters the compressor inlet port and may obstruct refrigerant flow resulting in an increase in the pressure drop across the reversing valve. Since the compressor must make up for the pressure drop, the overall efficiency of the heat pump system suffers.

By design, the compressor inlet port and two system ports are often arranged in a row along the exterior of the reversing valve. Accordingly, to direct refrigerant between any particular paring of the compressor inlet port and the two system ports, the valve member must channel the refrigerant through a relatively sharp bend. It is known that causing fluid to flow through a bend results in the development of turbulent secondary currents within the fluid stream. These turbulent currents cause shock and friction losses, and often require extensive lengths of relatively straight flow to dissipate. The shock and friction losses in turn add to the pressure drop across the reversing valve that must be made up for by the compressor, therefore reducing the efficiency of the heat pump system. It is also known that the magnitude of these losses is a function of the ratio between the inside and outside radiuses of the bend. Particularly, a larger difference between the inner radius and the outer radius results in a lower value of the curve ratio (inner radius/outer radius). A low valve for the curve ratio results in more pronounced turbulence and secondary flows, and accordingly increases the friction losses. However, to reduce the overall size of the reversing valve, prior art valve members typically have very small curve ratios, which accordingly degrades the efficiency of the heat pump system.

BRIEF SUMMARY OF THE INVENTION

The present invention provides a reversing valve designed to reduce the pressure drop across the valve member. Particularly, the reversing valve includes a movable valve member that defines a channel for communicating refrigerant or other fluid between a compressor inlet port and a selected one of two system ports. To reverse flow in a system incorporating the reversing valve, the reversing valve also includes an actuator that can selectively position the valve member to intersect either of the system ports while simultaneously intersecting the compressor inlet port.

The channel is generally shaped in a curve or otherwise designed to sharply bend the flow of fluid. To reduce the friction losses generated within the channel, the valve member includes a flow splitter that divides the channel into multiple sub-channels. Each sub-channel has a curve ratio larger than the curve ratio of the original channel. Additionally, the net curve ratio of the multiple sub-channels is greater than that of the original channel. By increasing the net curve ratio, the friction losses and shock caused by the valve member are reduced. Accordingly, the pressure drop across the reversing valve is also reduced. Moreover, the inclusion of the flow splitter into the channel provides additional structural support to the valve member, which allows for the elimination of the flow-obstructing support structures common in prior art valve members.

An advantage of the present invention is that the pressure drop across the valve member of a reversing valve is reduced resulting in a better system efficiency. Another advantage is that the valve member is provided with additional structural support in a manner that does not substantially obstruct fluid flow. Another advantage is that the present invention can be implemented with only minor changes to the valve member and can be easily incorporated into existing reversing valve designs. These and other advantages and features of the present invention will be apparent from the detailed description and the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 5 is a cross-sectional view of an embodiment of the valve member having a flow splitter taken along the length of the valve member.

FIG. 6 is a cross-sectional view of the valve member of FIG. 5 taken in the direction indicated by line 6—6 in FIG. 5.

FIG. 7 is a detailed view of the area indicated by line 7—7 in FIG. 6.

FIG. 8 is a cross-sectional view of an embodiment of the valve member having a flow splitter with two webs taken along the length of the valve member.

FIG. 9 is a cross-sectional view of the valve member of FIG. 8 taken in the direction indicated by line 9—9 in FIG. 8.

FIG. 10 is a detailed view of the area indicated by line 10—10 in FIG. 9.

FIG. 11 is a cross-sectional view of an embodiment of the valve member having both a flow splitter and a support bar taken along the length of the valve member.

FIG. 12 is a cross-sectional view of the valve member of FIG. 11 taken in the direction indicated by line 12—12 in FIG. 11.

FIG. 20A is a cross-sectional view of an embodiment of the valve member having a flow splitter snapped into grooves taken along the length of the valve member.

FIG. 21 is a cross-sectional view of the valve member of FIG. 20 taken in the direction indicated by line 21—21 of FIG. 20.

FIG. 22 is a detailed view of the area indicated by line 22—22 of FIG. 21.

FIG. 23 is a cross-sectional view of an embodiment of the valve member having a pre-formed flow splitter molded therein taken along the length of the valve member.

FIG. 24 is a cross-sectional view of the valve member of FIG. 23 taken in the direction indicated by line 24—24 of FIG. 23.

FIG. 25 is a detailed view of the area indicated by line 25—25 in FIG. 24.

FIG. 26 is a cross-sectional view of an embodiment of the valve member having a flow splitter integrally molded therein taken along the length of the valve member.

FIG. 27 is a cross-sectional view of the valve member of FIG. 26 taken in the direction indicated by line 27—27 of FIG. 26.

FIG. 28 is a cross-sectional view of an embodiment of the valve member having a flow splitter secured to a shell taken along the length of the valve member.

FIG. 29 is a cross-sectional view of the valve member of FIG. 28 taken in the direction indicated by line 29—29 in FIG. 28.

FIG. 30 is a detailed view of the area indicated by line 30—30 in FIG. 29.

FIG. 31 is a cross-sectional view of an embodiment of the valve member having a flow splitter secured to a shell by welding, brazing, or bonding taken along the length of the valve member.

FIG. 32 is a cross-sectional view of the valve member of FIG. 31 taken in the direction indicated by line 32—32 of FIG. 31.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE EMBODIMENTS

Figure 1:
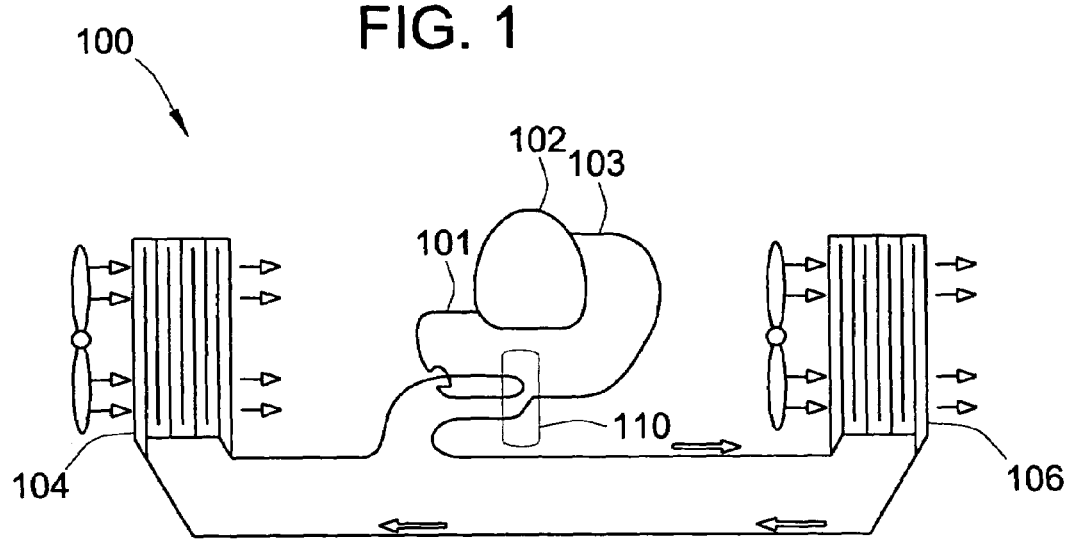
FIG. 1 is a schematic illustration of a reversible refrigeration system utilizing a reversing valve as operating in "cooling" mode.
Figure 2:
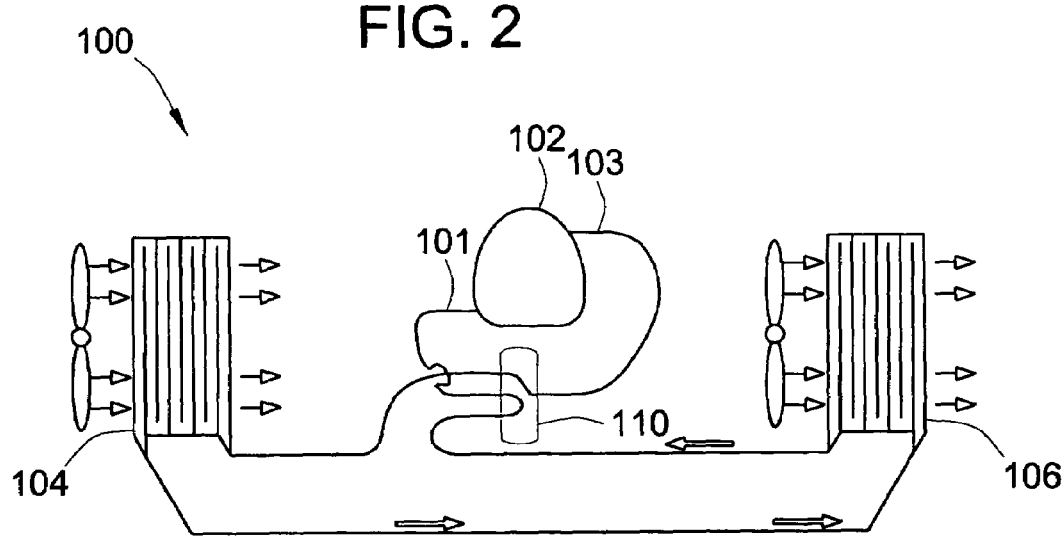
FIG. 2 is a schematic illustration of the reversible refrigeration system of FIG. 1 as operating in "heating" mode.

Now referring to the drawings, wherein like reference numbers refer to like elements, there is illustrated in FIGS. 1 and 2 a typical "heat-pump" style refrigeration system 100 in which a reversing valve of the present invention can be used. As described above, the heat pump refrigeration system is capable of selectively operating in either a heating or cooling mode. The refrigeration system 100 includes a compressor 102, an "inside" coil 104, and an "outside" coil 106, all of which are interconnected by tubing or piping for communicating liquid or vapor refrigerant. The terms "inside" and "outside" refer only to environments between which heat energy is to be exchanged and are not intended to necessarily refer to indoor and outdoor environments. To control the flow of heat within the system 100, the reversing valve 110 is interconnected between the compressor and the inside and outside coils.

In the cooling mode, illustrated in FIG. 1, heat energy is removed from the environment surrounding the inside coil 104 and transferred to the environment surrounding the outside coil 106. To accomplish this, in the first stage of the cycle, high temperature, pressurized refrigerant vapor from the discharge end 103 of the compressor 102 is first communicated by the reversing valve 110 to the outdoor coil 106. At the outdoor coil, the pressurized refrigerant vapor condenses into liquid refrigerant through an exothermic reaction through which heat energy is removed from the refrigerant and transferred to the outside environment. The pressurized liquid refrigerant is next directed to the inside coil 104. At the inside coil 104, in the second stage of the cooling cycle, the liquid refrigerant expands through an expansion device into a low pressure vapor phase through an endothermic reaction. During this reaction, heat energy from the indoor environment is removed by the refrigerant vapor flowing in the inside coil 104. The low pressure vapor is next directed to the inlet 101 of the compressor 102 where it is compressed back into the high pressure, high temperature vapor.

To operate the system in heating mode, in which heat energy generated by the compressor 102 is transferred to the inside environment, the reversing valve 110 is manipulated so that refrigerant flows essentially in reverse through the system. Specifically, as illustrated in FIG. 2, high temperature, pressurized vapor from the discharge 103 of the compressor 102 is first directed by the reversing valve 110 to the inside coil 102. At the inside coil 102, the pressurized refrigerant vapor condenses into liquid refrigerant through an exothermic reaction in which heat energy is removed from the refrigerant and transferred to the inside environment. The pressurized liquid refrigerant is next directed to the outside coil 106. At the outside coil 106, in the second stage of the heating cycle, the liquid refrigerant expands through an expansion device into a low pressure vapor phase through an endothermic reaction. The low pressure vapor is next directed to the inlet 101 of the compressor 102 via the reversing valve 110 where it is again compressed back into the high temperature, high pressure vapor.

Accordingly, as will be appreciated, the flow of heat energy in the heat pump system 100 is governed by the direction of refrigerant flow, which is regulated by the selective manipulation of the reversing valve 110. Reversing valves of various styles and configurations have been developed to accomplish the regulation of refrigerant flow. In addition to the various styles, reversing valves are available in a wide range of sizes and through-put to accommodate the wide range of heat pump system sizes as well as for other applications.

Figure 3:
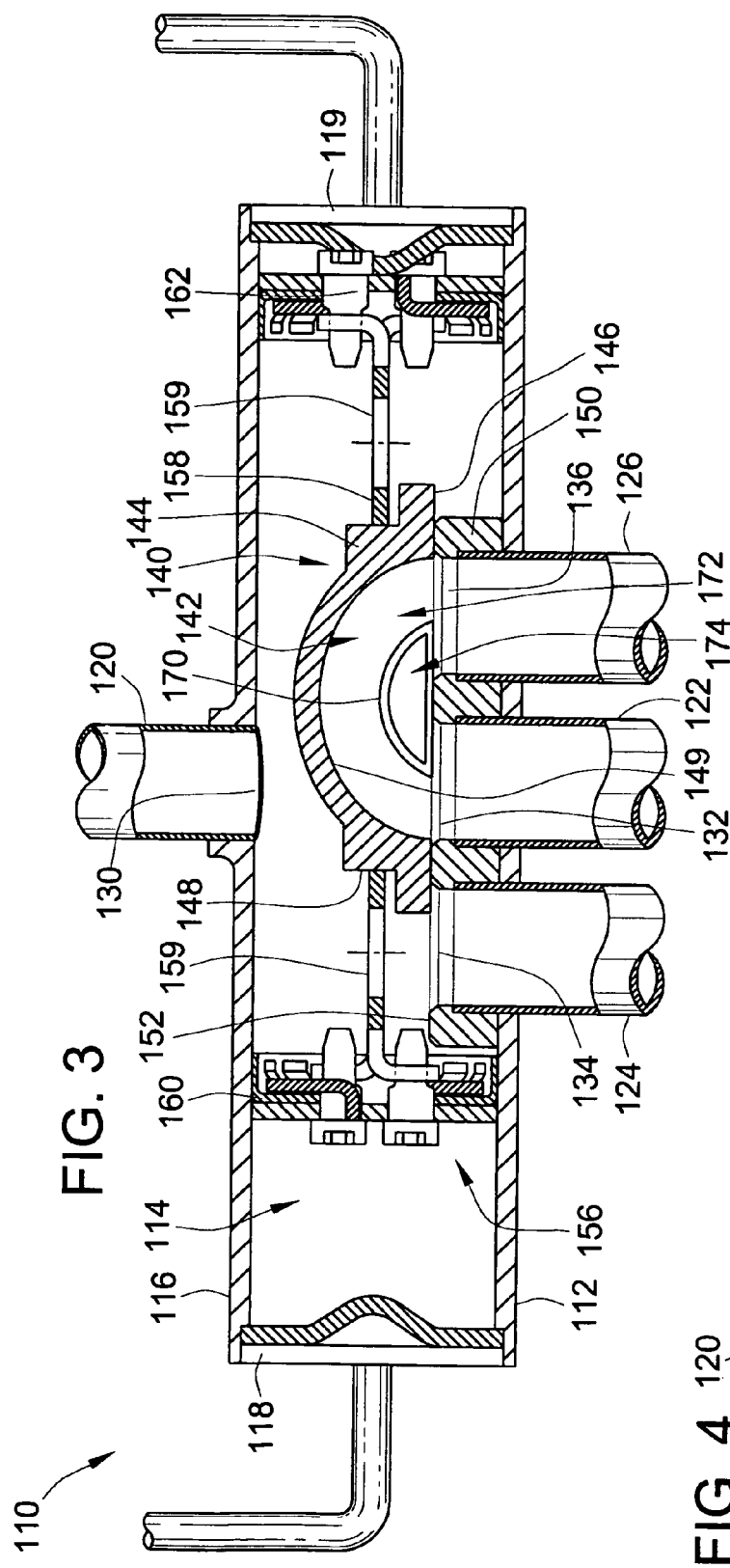
FIG. 3 is a cross-sectional view of a reversing valve including a movable valve member for selectively redirecting refrigerant between selected groupings of adjacent ports.

Referring to FIG. 3, there is illustrated an embodiment of a reversing valve 110 constructed in accordance with the teachings of the present invention. The reversing valve 110 includes an elongated, tubular valve body 112 that defines an internal chamber 114. In the illustrated embodiment, the valve body 112 includes a cylindrically-shaped sidewall 116, though in other embodiments, the valve body can have different shapes. To hermetically seal the internal chamber 114, a first and a second end cap 118, 119 are joined to the opposing ends of the cylindrical sidewall 116. Depending upon the requirements of the heat pump system, the components of the valve body can be constructed from various formable materials, such as metal or plastic.

To interconnect the reversing valve 110 to the heat pump system, a plurality of flow tubes, including at least a first, second, third, and fourth flow tube 120, 122, 124, 126 are provided. The flow tubes communicate with the internal chamber 114 through respective first, second, third, and fourth ports 130, 132, 134, 136 that are disposed through the sidewall 116. Preferably, the flow tubes are hermetically joined to the ports by, for example, welding or adhesive bonding. In the illustrated embodiment, the flow tubes are cylindrical and the ports are, accordingly, circular, although other configurations are possible as well.

When interconnected to the heat pump system, the first flow tube 120 communicates with the discharge 103 of the compressor 102 and therefore receives high pressure, high temperature refrigerant. The second flow tube 122 communicates with the inlet 101 of the compressor 102 and therefore directs low pressure, low temperature refrigerant returning from the system. The third and fourth flow tubes 124, 126, also known as the system tubes, communicate with the inside and outside heat exchangers 104, 106. By design, the second, third and fourth flow tubes 122, 124, 126 are arranged in a row along the axial length of the valve body 112, with the second flow tube located between the third and fourth flow tubes. In the illustrated embodiment, the first flow tube 120 and first port 130 are disposed through the sidewall 116 diametrically opposite the second, third and fourth flow tubes 122, 124, 126 and their respective ports 132, 134, 136, though this specific arrangement is not necessarily the same in other embodiments.

To direct the flow of refrigerant through the reversing valve 110, there is also included a valve member 140 that is located within the internal chamber 114 proximate to the second, third, and fourth ports, 132, 134, 136. The valve member 140 defines a channel 142 that directs flow between a selected pair of the second, third, and fourth ports. In the illustrated embodiment, the valve member 140 includes a valve block 144 that defines a smooth, planar first face 146. The channel 142 is disposed through the first face 146 and into the valve block 144. Preferably, the channel 142 has a length measured at the first face 146 that is sufficient to fully intersect a pair of the selected ports. Also preferably, the channel 142 has a width measured at the first face 146 that is sufficient to fully intersect the diameter of the circular ports 132, 134, 136.

In the present depiction of the reversing valve illustrated in FIG. 3, the valve member 140 is positioned to intersect the second and fourth ports 132, 136 while the first and third ports 130, 134 freely communicate with the internal chamber 114. It will be appreciated that, in operation, refrigerant returning from the heat exchangers through the fourth flow tube 126 will be communicated by the channel 142 defined in the valve member 140 to the second, or compressor inlet, flow tube 122. At the same time, high pressure refrigerant from the first, or compressor discharge, flow tube 120 will be communicated via the internal chamber 114 to the third flow tube 124 where the refrigerant will be directed into the heat exchangers.

To support the valve member 140 proximate to the second, third, and fourth ports 132, 134, 136, the valve body 112 includes a valve seat 150 that is formed as an embossment projecting inward from the cylindrical sidewall 116. The valve seat 150 defines a smooth, planar second face 152 through which the second, third, and fourth ports are disposed. When the valve member 140 is placed adjacent to the valve seat 150, the interaction of the first and second faces 146, 152 is such that the flow path defined by the channel 142 and the second and fourth flow tubes 122, 126 is substantially sealed from the refrigerant in the internal chamber 114. Accordingly, mixing of the low pressure and the high pressure refrigerant is prevented.

To reverse flow through the reversing valve 110, and thereby reconfigure the heat pump system, the valve member 140 can be moved within the internal chamber 114 between first and second positions. Specifically, the valve member 140 can slide relative to the valve seat 150 from a first position illustrated in FIG. 3 wherein the channel intersects the second and fourth ports 132, 136 to a second position in which the channel intersects the second and third ports 132, 134. As will be appreciated, in the second position, the channel 142 will communicate refrigerant between the second and third ports 132, 134 while the internal chamber 114 will communicate refrigerant between the first and fourth ports 130, 136. The sliding motion between the valve member 140 and the valve seat 150 is facilitated by the first and second planar faces 146, 152 which function as bearing surfaces.

Referring to FIG. 3, to manipulate the valve member 140 between the first and second positions, the reversing valve 110 includes an actuator 156 located inside the internal chamber 114. The actuator includes a bracket 158 that is suspended along the axis of the tubular valve body 112 between opposing first and second pistons 160, 162. The pistons are located on opposite sides of the valve seat 150 proximate to the respective first and second end caps 118, 119. The pistons 160, 162 are capable of sliding movement within the internal chamber 114 while sealing against the inner surface of the cylindrical sidewall 116. To facilitate the sliding and sealing of the pistons 160, 162, the pistons can be fitted with skirt-like piston rings or cups.

To join the valve member 140 to the actuator 156, the valve member can include an appropriately shaped coupling structure 148 that can be received in a correspondingly shaped opening formed in the bracket 158. To provide for free communication of refrigerant within the internal chamber 114, the bracket 158 can also include a plurality of additional openings 159.

Figure 4:
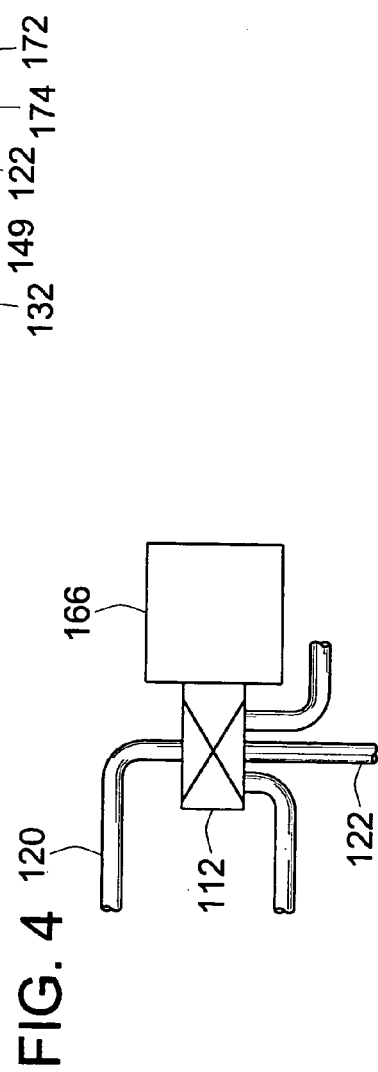
FIG. 4 is a schematic drawing of a pilot valve for use with the reversing valve.

The actuator 156 is reciprocally movable along the longitudinal axis of the valve body 112. To control the motion of the actuator 156, in the present embodiment, the reversing valve 110 includes a pilot valve 166 that can be attached to the exterior of the valve body 112 as illustrated in FIGS. 3 and 4. The pilot valve 166 is an electrically-operated device that is in communication with refrigerant from the high pressure compressor discharge and from the low pressure compressor inlet. Upon selection, the pilot valve 166 can direct high pressure and low pressure refrigerant to either of the opposing ends of the valve body 112. This produces a pressure differential that acts upon the first and second pistons 160, 162 causing the actuator 156 to shift the valve member 140 between the first and second positions.

Referring again to FIG. 3, because the second, third, and fourth ports 132, 134, 136 are aligned in a row along the cylindrical sidewall 116, the valve member 140 redirects the refrigerant flow through a sharp bend of approximately 180 degrees. To accomplish this, in the illustrated embodiment, the channel 142 is generally shaped as a hemispherical curve that is defined by a corresponding flow surface 149 that extends along the valve block 144. Because of the hemispherical shape of the channel 142, the outer radius of the bend imparted on the refrigerant is equal to the largest distance between the second face 152 of the valve seat 150 and the flow surface 149. The inner radius, however, is negligible. Accordingly, the curve ratio (inner radius/outer radius) is very small which, as discussed above, results in secondary flows, turbulence, and shock thereby reducing the efficiency of the reversing valve and the heat-pump system.

In accordance with the teachings of the present invention, to reduce the adverse effects of redirecting the fluid through the channel 142, the valve member 140 includes a flow splitter 170 that divides the channel 142 into multiple sub-channels 172, 174. Each sub-channel 172, 174 has a larger curve ratio than that of the original channel 142 defined by the valve member 140. Moreover, the net curve ratio of all the sub-channels is larger than the curve ratio of the original channel. Because the net curve ratio is larger, the losses associated with the valve member and, accordingly, the pressure drop across the reversing valve are reduced. This in turn increases the efficiency of the heat pump system.

Referring to FIGS. 5, 6, and 7, there is illustrated an embodiment of the flow splitter 170 secured to the valve block 144 so that the flow splitter is located within the channel 142. To divide the channel into first and second sub-channels 172, 174, the flow splitter 170 includes a web 178 of thin material that extends substantially across the width of the channel and is more or less offset from the flow surface 149. Moreover, the web 178 generally corresponds in shape to the channel 142 and the flow surface 149 and is preferably placed in a symmetrical location within the channel. Accordingly, the first and second sub-channels parallel each other and, in the illustrated embodiment where the channel is shaped as a hemispherical curve, the sub-channels 172, 174 resemble concentric arcs.

Importantly, the flow splitter 170 needs to be inserted into the channel 142 in such a manner that the flow splitter will not interfere with the second face 152 of the valve seat 150 when the valve member 140 moves between the first and second positions. This can be accomplished by, for example, recessing all portions of the flow splitter 170 into the channel 142 and beyond the first face 146.

In addition to dividing the channel 142 into sub-channels 172, 174, the flow splitter 170 provides the valve member 140 with additional structural support to prevent the valve member from deforming or collapsing under the pressure differential existing within the valve body. For example, because the web 178 extends substantially across the width of the channel 142, the web braces the first and second sides 184, 186 of the valve block 144 to prevent them from collapsing together. Moreover, because the web 178 is made from a thin material that is shaped so as to be incident to the intersected ports, the web does not substantially obstruct the flow of fluid refrigerant. In some embodiments, this may allow for eliminating the support bars that had often been included in prior art reversing valves.

In the embodiment illustrated in FIGS. 5, 6, and 7, the flow splitter 170 can be formed separately from the valve block 144 and inserted into the channel 142 to assemble the valve member 140. The illustrated flow splitter 170 includes a first leg 180 and a second leg 182 between which the web 178 extends. The legs are generally parallel to each other and are generally perpendicular to the web. When inserted into the channel 142, the first and second legs 180, 182 are adjacent to the opposing sides 184, 186 of the valve block 144.

To secure the flow splitter 170 to the valve block 144 in such a manner that the flow splitter is accurately located within the channel 142, the flow splitter and valve block can be assembled in a snap-fit engagement. Specifically, as illustrated in FIGS. 6 and 7, the valve block 144 can include a shoulder 188 projecting into the channel proximate to the first face 146. The shoulder 188 may project from either or both sides 184, 186 of the valve block 144. As the flow splitter is inserted into the channel, the legs 180, 182 are first compressed together then snap over the shoulder 188. Hence the engagement between the shoulder 188 and the legs 180, 182 in part determines the offset between the web 178 and the flow surface 149.

Depending upon the pressures, temperatures, and nature of the refrigerant fluids, the valve block and the flow splitter can be made from any suitable material. For instance, in the illustrated embodiment, to provide rigidity, the valve block 144 can be made from cast metal or molded plastic. To provide both the strength necessary to allow the flow splitter 170 to function as a structural support and the flexibility to enable the snap-fit engagement, the flow splitter can be manufactured from formed sheet metal or molded, thin-walled plastic.

Referring to FIGS. 8, 9, and 10, there is illustrated another embodiment of a valve member 200 for use in a reversing valve that is designed to improve heat pump efficiency. The valve member 200 includes a valve block 202 defining a first face 204 into which a channel 210 is disposed. Also included is a flow splitter 220 that divides the channel 210 into three sub-channels 212, 214, 216. The channel 210 is generally shaped as a hemispherical curve that is defined by a corresponding flow surface 206 that extends along the valve block 202. To divide the channel 210 into the first, second, and third sub-channels 212, 214, 216, the flow splitter 220 includes a first and a second web 222, 224 that are made from a thin material. Both webs 220, 222 extend substantially across the width of the channel and are more or less offset from the flow surface and from each other. Moreover, the webs 220, 222 generally correspond in shape to the channel 210 and flow surface 206 and are positioned about mid-length of the channel. Each of the sub-channels 212, 214, 216 has a larger curve ratio than the original channel 210, thereby reducing the pressure drop across the reversing valve and improving heat pump efficiency as described above.

In addition to dividing the channel into three sub-channels, the flow splitter 220 also provides additional structural support to prevent the valve member 200 from deforming or collapsing due to the pressure differential existing in the reversing valve. For example, because the first and second webs 222, 224 extend substantially across the width of the channel 210, the webs brace the first and second sides 240, 242 of the valve block 202 preventing them from collapsing together. In some embodiments, this may allow for the elimination of the additional support bar commonly found in some prior art valve members.

In the embodiment illustrated in FIGS. 8, 9, and 10, the flow splitter 220 can be formed separately from the valve block 202 and inserted into the channel 210 to assemble the valve member 200. To secure the flow splitter 220 to the valve block 202, the flow splitter and the valve block can be assembled together in a snap-fit manner. Specifically, as illustrated in FIGS. 9 and 10, the valve block 202 can include a shoulder 248 that projects into the channel 210 proximate the first face 204. The flow splitter 220 can include a first and a parallel second leg 226, 228 between which the first and second webs 222, 224 extend. As the flow splitter 220 is inserted into the channel 210, the legs 226, 228 first compress together then snap over the shoulder 248.

Referring to FIGS. 11 and 12, there is illustrated an embodiment of the valve member 300 for use in a reversing valve that includes both a flow splitter 320 and a support bar 330. Depending upon the application, the flow splitter and the support bar can be manufactured from any suitable material including, for example, plastic. The valve member 300 includes a valve block 302 that defines a first face 304, a flow surface 306, and a curved channel 310 that is disposed into the valve block. The flow splitter 320 and support bar 330 are located in the channel 310 and are positioned about mid-length of the channel. To divide the channel 310 into first and second sub-channels 312, 314, the flow splitter 320 includes a web 322 that extends substantially across the channel. The web 322 is substantially shaped to correspond to both the flow surface 306 and the channel 310 so that the first and second sub-channels 312, 314 are shaped as concentric arcs.

To provide additional structural support for preventing the valve member 300 from distorting or collapsing, both the web 322 of the flow splitter 320 and the support bar 330 extend across the width of the channel 310 between the first and second sides 340, 342 of the valve block 302. The flow splitter 320 can include first and second legs 326, 328 between which the web 322 extends and can be formed separately from the valve block 302 and inserted into the channel 310 as described above. The support bar 330 has a generally flat profile with a contoured shape to minimize obstruction of the refrigerant flow. In the illustrated embodiment, the support bar 330 is located in the second sub-channel 314. Referring to FIG. 12, to secure the support bar 330 to the valve member 300, a notch 348 can be formed in either side 340, 342 of the valve block 302 proximate the first face 304 that can receive the ends of the support bar. The support bar can be further secured to the sides by, for example, ultrasonic welding. The location of the support bar 330 below the first and second legs 326, 328 functions to secure the flow splitter 320 to the valve block 304.

Figure 13:
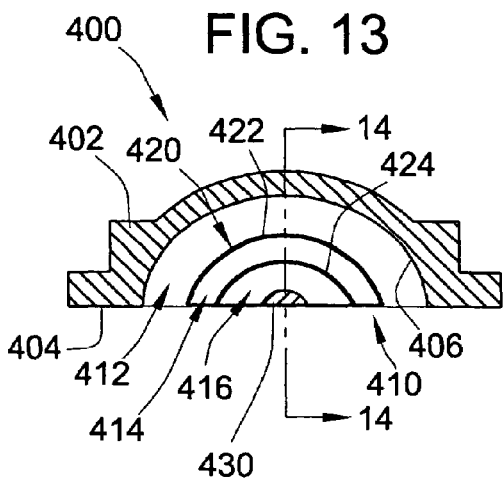
FIG. 13 is a cross-sectional view of an embodiment of the valve member having both a flow splitter with two webs and a support bar taken along the length of the valve member.
Figure 14:
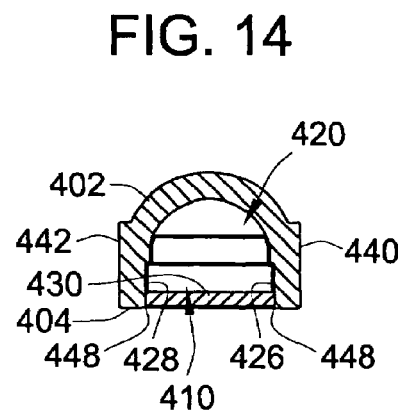
FIG. 14 is a cross-sectional view of the valve member of FIG. 13 taken in the direction indicated by line 14—14 in FIG. 13.

Referring to FIGS. 13 and 14, there is illustrated an embodiment of a valve member 400 for use in a reversing valve that includes a flow splitter having two webs and a support bar. The valve member includes a valve block 402 that defines a first face 404, a flow surface 406, and a channel 410 that is disposed into the valve block. The flow splitter 420 and the support bar 430 are both located in the channel 410. The first and second webs 422, 424 extend across the width of the channel 410 and divide the channel into first, second, and third sub-channels 412, 414, 416. The webs 422, 424 are substantially shaped to correspond to both the flow surface 406 and the channel 410 so that the first, second, and third sub-channels 412, 414, 416 are shaped as concentric arcs.

To provide additional structural support for preventing the valve member 400 from distorting or collapsing, both the webs 422, 424 of the flow splitter 420 and the support bar 430 extend across the width of the channel 410 between the first and second sides 440, 442 of the valve block 402. The flow splitter 420 can include first and second legs 426, 428 and can be formed separately from the valve block 402 and inserted into the channel 410 as described above. The support bar 430 has a generally flat profile with a contoured shape to minimize obstruction of the refrigerant flow. In the illustrated embodiment, the support bar 430 is located in the third sub-channel 416. Referring to FIG. 14, to secure the support bar 430 to the valve member 400, a notch 448 can be formed in either side 440, 442 of the valve block 402 proximate the first face 404 that can receive the ends of the support bar. The support bar can be further secured to the sides by, for example, ultrasonic welding. The location of the support bar 430 below the first and second legs 426, 428 functions to secure the flow splitter 420 to the valve block 404.

Figure 15:
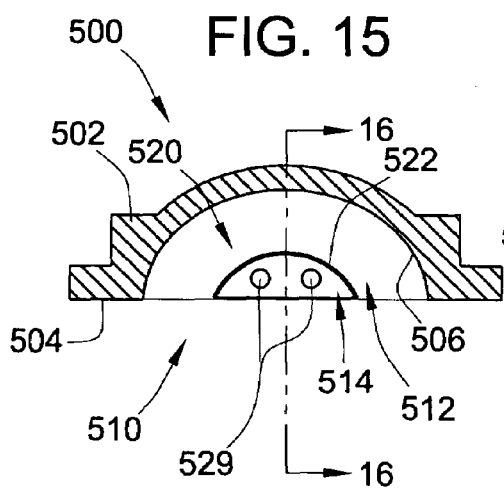
FIG. 15 is a cross-sectional view of an embodiment of the valve member having a flow splitter secured with securing apertures taken along the length of the valve member.
Figures 16, 17:
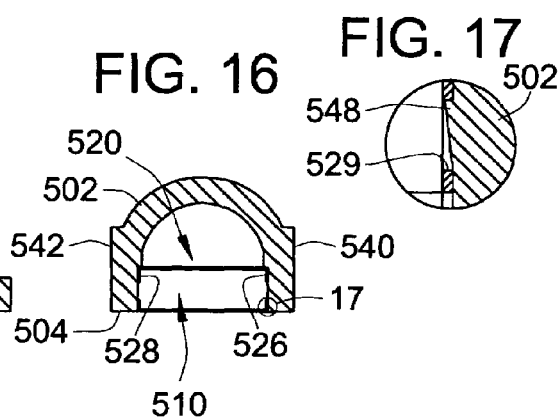
FIG. 16 is a cross-sectional view of the valve member of FIG. 15 taken in the direction indicated by line 16—16 in FIG. 15.
FIG. 17 is a detailed view of the area indicated by line 17—17 in FIG. 16.

Referring to FIGS. 15, 16, and 17, there is illustrated another embodiment of the valve member 500 including a valve block 502 into which a channel 510 is disposed and a flow splitter 520 secured therein. The valve block 502 also defines a face 504 and a flow surface 506. The flow splitter 520 is formed separately from the valve block 504 and can be inserted into the channel 510. Depending upon the application, the flow splitter can be made from any suitable material including, for example, plastic. To divide the channel 510 into multiple sub-channels 512, 514, the flow splitter 520 includes a web 522 extending across the width of the channel. Furthermore, the web 522 generally corresponds in shape to both the flow surface 506 and the channel 510 and is located approximately mid-length of the channel such that the web is generally offset from the flow surface. To support the web 522 within the channel, the flow splitter 520 also includes first and second legs 526, 528 between which the web extends.

Referring to FIGS. 16 and 17, to secure the flow splitter 520 to the valve member 500, the valve block 502 includes one or more inclined protrusions 548 projecting into the channel. The inclined protrusions project from either the first, second, or both sides 540, 542 of the valve block 502 and are offset a slight distance from the first face 504. The angle of incline is also directed away from the first face. Additionally, disposed through at least the first leg 526 of the flow splitter 520 are one or more apertures 529, each of which is located to correspond to one inclined protrusion 548. As the flow splitter 520 is inserted into the channel 510, the first and second legs 526, 528 are collapsed together by the inclined protrusions 548. Once the valve block 502 and flow splitter 520 are appropriately aligned, the inclined protrusions 548 are received into the apertures 529 thereby securing the flow splitter. As will be appreciated, receiving the inclined protrusions 548 into the apertures 529 also accurately locates the web 522 within the channel 510 and determines the offset between the web and the flow surface 506. It will also be appreciated that the presently described manner for securing the flow splitter can be used with flow splitters having any number of webs.

Figure 18:
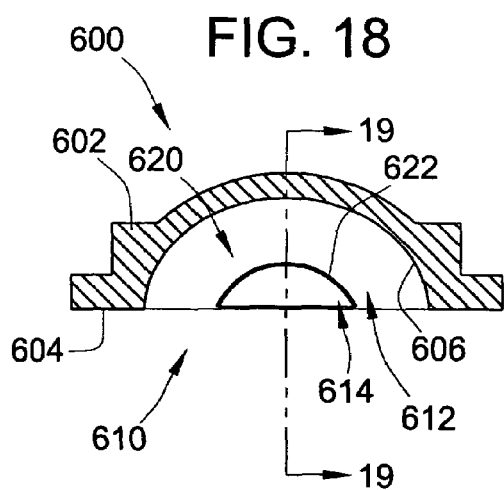
FIG. 18 is a cross-sectional view of an embodiment of the valve member having a flow splitter secured by press fitting, bonding, or welding taken along the length of the valve member.
Figure 19:
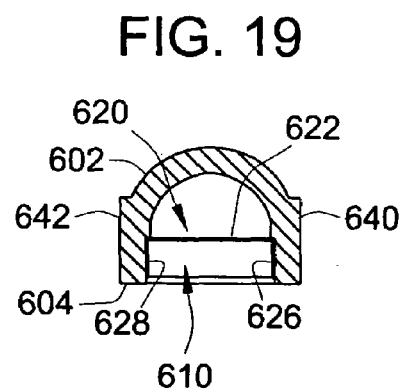
FIG. 19 is a cross-sectional view of the valve member of FIG. 18 taken in the direction indicated by line 19—19 of FIG. 18.

Referring to FIGS. 18 and 19, there is illustrated another embodiment of a valve member 600 including a valve block 602 into which a channel is disposed and a flow splitter 620 secured therein. The valve block 602 also defines a face 604 and a flow surface 606. The flow splitter 620 is formed separately from the valve block 604 and can be inserted into the channel 610. Depending upon the application, the flow splitter can be made from any suitable material including, for example, formed metal or thin-walled plastic. To divide the channel 610 into multiple sub-channels 612, 614, the flow splitter 620 includes a web 622 extending across the width of the channel. Furthermore, the web 622 generally corresponds in shape to the flow surface 606 and the channel 610 and is located approximately mid-length of the channel such that the web is generally offset from the flow surface. To support the web 622 within the channel, the flow splitter 620 also includes first and second legs 626, 628 between which the web extends.

The flow splitter 620 can be secured to the valve member 600 in a number of ways. For example, the span between the first and second legs 626, 628 of the flow splitter 620 can be sized slightly larger than the span between the first and second sides 640, 642 of the channel 610. As will be appreciated, the difference in span dimensions requires that the flow splitter 620 be press-fitted to the valve block 602 when the flow splitter is inserted into the channel 610. As another way of securing the flow splitter 620 to the valve member 600, the first and second legs 626, 628 can be bonded with an adhesive agent to the respective first and second sides 640, 642 of the valve block 602. Where the flow splitter and valve block are made of similar materials, another way of securing the two together includes welding the first and second legs 626, 628 to the respective first and second sides 640, 642. It will be appreciated that the presently described manners for securing the flow splitter can be used with flow splitters having any number of webs.

Referring to FIGS. 20A, 20B, 21, and 22, there is illustrated another embodiment of the valve member 700 including a valve block 702 into which a channel 710 is disposed and a flow splitter 720 secured therein. The valve block 702 also defines a face 704 and a flow surface 706. The flow splitter 720 is formed separately from the valve block 704 and can be snapped into the channel 710. Depending upon the application, the flow splitter can be made from any suitable material including, for example, formed metal or thin walled plastic. To divide the channel 710 into first and second sub-channels 712, 714, the flow splitter 720 primarily includes a web 722 generally extending across the width of the channel. The web 722 has a first edge 726 and a second edge 728 that correspond respectively to the first and second sides 740, 742 of the valve block 702. Furthermore, the web 722 is located approximately mid-length of the channel 710 and is generally offset from the flow surface 706.

Figure 20B:
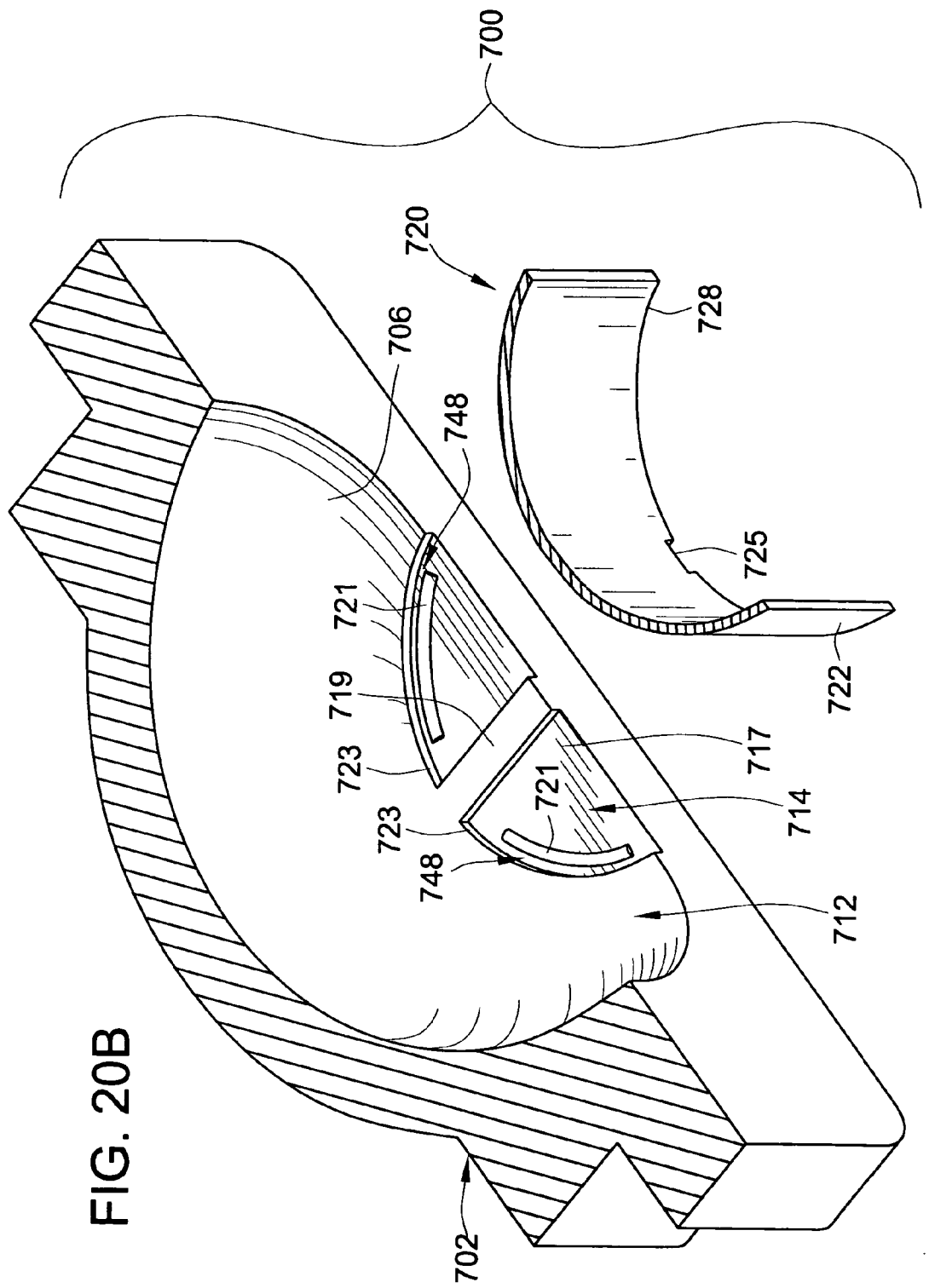
FIG. 20B is a cross-sectional perspective view of corresponding to FIG. 20A, showing details of the embodiment of the valve member having a flow splitter snapped into grooves taken along the length of the valve member.

A portion of the flow surface 706 in the second sub-channel 714 is contoured to form first and second recessed side walls 715, 717 corresponding respectively to the first and second sides 740, 742 of the valve block 702. As best seen in FIG. 20B, specifically illustrating the second recessed side wall 717, each of the first and second recessed side walls 715, 717 has extending outward therefrom a raised key 719 and a pair of raised radiused ribs 721.

The radiused ribs 721 are spaced radially inward, a distance roughly equal to a thickness of the web 722 of the flow splitter 720, from a shoulder 723 formed by the intersection of the recessed side walls 715, 717 with the remainder of the flow surface 706, to form first and second grooves 746, 748, corresponding respectively to the first and second sides 740, 742 of the valve block 702. The resultant shape of each of the first and second grooves 746, 748 corresponds generally to the curvature of the flow channel 706, and the grooves 746, 748 are offset from the flow surface to the same degree to which the web 722 of the flow divider 720 is to be offset.

The first and second edges 726, 728 of the web 722 each include a notch 725 configured to fit over the keys 719 in the first and second recessed side walls 715, 717, when the web 722 of the flow splitter 720 is snapped into the grooves 746, 748. Because the grooves 746, 748 are shaped to correspond to the flow surface 706 and channel 710, the planar web 722 is likewise contorted to correspond to the shape of the flow surface 706 and channel 710. It will be appreciated that, in order to accommodate multiple webs, the valve block can include multiple pairs of grooves that are offset from the flow surface and from each other.

Referring to FIGS. 23 and 24, there is illustrated another embodiment of the valve member 800 including a valve block 802 into which a channel 810 is disposed and a flow splitter 820 secured therein. The valve block 802 also defines a face 804 and a flow surface 806. Preferably, in the illustrated embodiment, the valve block 804 is made from molded plastic. To divide the channel 810 into multiple sub-channels 812, 814, the flow splitter 820 primarily includes a web 822 extending across the width of the channel. Furthermore, the web 822 generally corresponds in shape to the flow surface 806 and the channel 810 and is located approximately mid-length of the channel such that the web is generally offset from the flow surface 806.

To secure the flow splitter 820 to the valve member 800 in the present embodiment, the flow splitter is formed before the valve block 802 is molded. Preferably, the flow splitter 820 is made from a metal sheet which is pre-formed to correspond to the shape of the flow surface 806 and the channel 810. Additionally, the web 822 of the flow splitter includes first and second edges 826, 828 that correspond to the first and second sides 840, 842 of the valve block 802. To produce the valve member 800, the pre-formed flow splitter 820 is inserted at an appropriate location into a mold that is configured to produce the valve block 802. Plastic resin is next introduced into the mold and cured around the first and second edges 826, 828 of the flow splitter 820. Accordingly, upon removal of the valve member 800 from the mold, the flow splitter 820 is suspended within the channel 810 at the desired offset from the flow surface 806. It will be appreciated that, in order to produce a valve member having three or more sub-channels according to the presently described securing manner, multiple webs can be inserted into the mold at appropriate locations.

Referring to FIGS. 26 and 27, there is illustrated another embodiment of the valve member 900 including a valve block 902 into which a channel 910 is disposed and a flow splitter 920 secured therein. The valve block 902 also defines a face 904 and a flow surface 906. To divide the channel 910 into multiple sub-channels 912, 914, the flow splitter 920 primarily includes a web 922 extending across the width of the channel between the first and second sides 940, 942 of the valve block 902. Furthermore, the web 922 generally corresponds in shape to the flow surface 906 and the channel 910 and is located approximately mid-length of the channel such that the web is generally offset from the flow surface. In the illustrated embodiment, to secure the flow splitter to the valve block, the two are molded together simultaneously. Accordingly, the flow splitter and valve block must be made of the same material, for example, plastic or metal. It will be appreciated that, in order to produce a valve member having three or more sub-channels according to the presently described securing manner, a flow splitter having multiple webs can be molded simultaneously with the valve block.

Referring to FIGS. 28, 29 and 30, there is illustrated another embodiment of a valve member 1000 for use in a reversing valve that is designed to improve heat pump efficiency. The valve member 1000 includes a valve block 1002 that defines a channel 1010 for redirecting refrigerant flow between a selected pair of ports disposed through the valve body. The valve block 1002 includes a thin-walled shell 1004 and a flange 1006 extending orthogonally from the rim of the shell. The inner surface of the shell defines a flow surface 1008 for redirecting refrigerant flow. In the illustrated embodiment, the flange 1006 extends around the periphery of the shell 1004 and defines, on its lower surface, a first face 1009. The channel 1010 is formed into the shell 1004 and preferably has a length measured at the first face 1009 that is sufficient to fully intersect a pair of the selected ports. Also preferably, the channel 1010 has a width measured at the first face 1009 that is sufficient to fully intersect the diameter of the circular ports.

The shell 1004 and flange 1006 are preferably formed from thin-walled material and can include one or more layers of material. For example, depending upon the application, the shell and flange can be formed from sheet metal or molded plastic. Additionally, the shell and flange can be formed by any number of various forming methods, such as drawing and stamping or vacuum molding. Moreover, the shell and flange can each be formed from an integral layer, separate layers, or a combination of the both integral and separate layers.

To reduce the adverse effects of redirecting the fluid through the channel 1010, as described above, the valve member 1000 includes a flow splitter 1020 that divides the channel into first and second sub-channels 1012, 1014. The flow splitter 1020 includes a web 1022 that extends across the width of the channel 1010 and that generally corresponds to the shape of the flow surface 1008 and the channel. Furthermore, the web 1022 is located approximately mid-length of the channel 1010 such that the web is generally offset from the flow surface 1008. The flow splitter 1020 can be produced separately from the shell 1004 and flange 1006 and inserted into the channel 1010. Depending upon the application, the flow splitter 1020 can be made from any suitable thin-walled material such as a formed sheet of metal or plastic.

To secure the flow splitter 1020 to the valve member 1000, the flow splitter includes a first leg 1026 and a parallel second leg 1028 that extend orthogonally from and are spaced apart by the web 1022. Projecting from at least the first leg 1026, in a direction away from the second leg 1028, are one or more barbs 1029. Additionally, the valve block 1002 includes one or more notches 1040 disposed from the channel 1010 into the shell 1004 and located near the first face 1009. Each notch 1040 is located to correspond to one barb 1029. When the flow splitter 1020 is inserted into the channel 1010, the barbs 1029 are received in the notches 1040. As will be appreciated, receiving the barbs into the notches also accurately locates the web within the channel and determines the offset between the web and the flow surface. To avoid interfering with the sliding of the valve member 1000 with respect to the valve body when the valve member shifts positions, the flow splitter 1020, including the first and second leg 1026, 1028, is completely recessed into the channel 1010 beyond the face 1009. It will be appreciated that, in order to produce a valve member having three or more sub-channels, the flow splitter can include multiple webs.

Referring to FIGS. 31 and 32, there is illustrated another embodiment of the valve member 1100 having a valve block 1102 in the form of a shell 1104 defining a channel 1110 and a flow splitter 1120 secured in the channel. The valve block 1102 also includes a flange 1106 extending orthogonally from the rim of the shell 1104, the lower surface of which defines a first face 1109. The inner surface of the shell 1104 defines a flow surface 1108 for redirecting the refrigerant flow. To divide the channel 1110 into multiple sub-channels 1112, 1114, the flow splitter 1120 includes a web 1122 extending across the width of the channel. Furthermore, the web 1122 generally corresponds in shape to the flow surface 1108 and the channel 1110 and is located approximately mid-length of the channel such that the web is generally offset from the flow surface. To support the web 1122 within the channel 1110, the flow splitter 1120 also includes generally parallel first and second legs 1126, 1128 between which the web extends.

To secure the flow splitter 1120 to the valve member 1100, the flow splitter is inserted into the channel 1110 so that the first and second legs 1126, 1128 are aligned with a first and second side 1140, 1142 of the shell 1104 so that the web 1122 is accurately located with respect to the channel. The legs 1126, 1128 and respective sides 1140, 1142 are then joined by any number of appropriate methods. For example, where the flow splitter 1120 and the shell 1104 are made of metal, the legs 1126, 1128 and sides 1140, 1142 can be spot welded or brazed together. As another example, the legs 1126, 1128 and sides 1140, 1142 can be bonded together with an adhesive. It will be appreciated that, in order to produce a valve member having three or more sub-channels, the flow splitter can include multiple webs.

Accordingly, the present invention provides a reversing valve designed to reduce the pressure drop across the valve and thereby improve the efficiency of a refrigeration system. The reversing valve includes a valve member selectively movable between first and second positions in order to intersect a different pair of ports. The valve member defines a channel for redirecting the fluid flow from the first of the intersected ports toward the second of the intersected ports. To reduce shock and friction losses imparted by the channel, the valve member includes a flow splitter that divides the channel into multiple sub-channels. In addition to creating multiple sub-channels, the flow splitter also provides the valve member with additional structural support to resist the deforming or collapsing of the valve member due to pressure differentials existing within the reversing valve.

All references, including publications, patent applications, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A reversing valve comprising:
    a tubular valve body defining an internal chamber, the valve body including a first, second, third, and fourth port disposed therein;
    a valve member defining a channel for providing a flow path between a selectable pair of the second, third or fourth ports, the valve member including a flow splitter dividing the channel into a plurality of sub-channels, the valve member proximate to and movable with respect to the second, third, and forth ports;
    an actuator reciprocally movable inside the valve body and engaging the valve member;
    whereby, when the actuator is moved to a first position, the channel intersects the second and third ports thereby establishing fluid communication between the second and third ports while simultaneously allowing fluid communication between the first and fourth ports via the internal chamber; and
    whereby, when the actuator is moved to a second position, the channel intersects the second and fourth ports thereby establishing fluid communication between the second and fourth ports while simultaneously allowing fluid communication between the first and third ports via the internal chamber.

2. The reversing valve of claim 1, wherein the channel has a length and a width and defines a flow surface within the valve member, and the flow splitter includes a web located substantially within and extending generally across the width of the channel, the web being generally offset from the flow surface and dividing the channel into a first and a second sub-channels.

3. The reversing valve of claim 2, wherein the flow surface curves over the channel length and the web generally corresponds in shape to the flow surface.

4. The reversing valve of claim 3, wherein the flow splitter includes a second web located substantially within the second sub-channel and separating the second sub-channel into second and third sub-channels, the second web generally corresponding in shape to and being generally offset from the first web.

5. The reversing valve of claim 2, wherein the valve member includes a rigid valve block defining a face, the channel disposed into the face, and the flow surface extending along the length of the valve block.

6. The reversing valve of claim 5, wherein the flow splitter is formed separately from the valve block and inserted into the channel, the flow splitter further including a first leg and a second leg, the web extending between the first and second legs.

7. The reversing valve of claim 6, wherein the valve block includes a shoulder projecting into the channel and the flow splitter is secured to the valve block by a snap-fit engagement between the first leg and the shoulder.

8. The reversing valve of claim 6, wherein the valve member further includes a support bar extending across the width of the channel proximate to the face and the flow splitter is secured to the valve block by the support bar.

9. The reversing valve of claim 6, wherein the flow splitter is secured to the valve block by a process consisting of welding, soldering, press-fitting, or adhesive bonding.

10. The reversing valve of claim 6, wherein the valve block includes an inclined protrusion projecting into the channel and the flow splitter includes an aperture disposed through the first leg, the flow splitter is secured to the valve block by receiving the inclined protrusion into the aperture.

11. The reversing valve of claim 5, wherein the valve block includes a first groove and a second groove each disposed into the flow surface on opposite sides of the channel, and the web of the flow splitter includes a first edge and an opposing second edge, the first and second edges being received respectively in the first and second grooves.

12. The reversing valve of claim 5, wherein the valve block and the flow splitter are integrally molded together.

13. The reversing valve of claim 2, wherein the second, third, and fourth ports are aligned in a row with the second port between the third and forth ports.

14. The reversing valve of claim 13, wherein the length of the channel is sufficiently sized to fully intersect the second port and third port when the actuator is in the first position and to fully intersect the second and fourth ports when the actuator is in the second position.

15. The reversing valve of claim 2, wherein the valve member includes a valve block comprising a shell, the channel being formed into the shell.

16. The reversing valve of claim 15, wherein the flow splitter is formed separately from the valve block and is inserted into the channel, the flow splitter further including a first leg and a second leg, the web extending between the first and second legs.

17. The reversing valve of claim 16, wherein the flow splitter is secured to the valve block by a process consisting essentially of brazing, welding, soldering or adhesive bonding.

18. The reversing valve of claim 16, wherein the valve block includes a notch disposed into the shell from the channel.

19. The reversing valve of claim 18, wherein the first leg of the flow splitter includes a barb projecting in a direction away from the second leg, the flow splitter inserted into the channel such that the barb is received in the notch.

20. The reversing valve of claim 5, wherein the valve block comprises a metal material.

21. The reversing valve of claim 5, wherein the valve block comprises a molded plastic.

22. The reversing valve of claim 1, wherein the flow splitter comprises a formed metal.

23. The reversing valve of claim 1, wherein the flow splitter comprises a molded plastic.

24. The reversing valve of claim 1, wherein the tubular valve body includes a cylindrical sidewall, the first, second, third and fourth ports beings disposed through the sidewall, and the first port is located opposite from the second, third, and fourth ports.

25. The reversing valve of claim 24, wherein the second, third, and fourth ports are aligned along the axial length of the sidewall with the second port located between the third and forth ports.

26. The reversing valve of claim 25, further comprising a first, second, third, and fourth flow tubes communicating respectively with the first, second, third, and fourth ports and extending generally away from the valve body.

27. The reversing valve of claim 26, further comprising a pilot valve for actuating the actuator between the first position and the second position.

* * * * *